US007811200B2

(12) United States Patent
Chiang

(10) Patent No.: US 7,811,200 B2
(45) Date of Patent: Oct. 12, 2010

(54) MULTIFUNCTIONAL VIRTUAL-REALITY FITNESS EQUIPMENT WITH A DETACHABLE INTERACTIVE MANIPULATOR

(75) Inventor: Johnson Chiang, Tucheng (TW)

(73) Assignee: Yin-Liang Lai, Tuchen, Taipei County (TW)

( * ) Notice: Subject to any disclaimer, the term of this patent is extended or adjusted under 35 U.S.C. 154(b) by 1342 days.

(21) Appl. No.: 11/220,589

(22) Filed: Sep. 8, 2005

(65) Prior Publication Data
US 2006/0063645 A1    Mar. 23, 2006

(51) Int. Cl.
*A63B 15/02*    (2006.01)
(52) U.S. Cl. .............................................. 482/1; 463/1
(58) Field of Classification Search ...................... 482/1, 482/2, 3, 4, 5, 6, 7, 8, 57, 901, 902; 434/247, 434/257; 601/23, 33, 36; 463/1, 38
See application file for complete search history.

(56) References Cited

U.S. PATENT DOCUMENTS

| | | | | |
|---|---|---|---|---|
| 5,591,104 | A * | 1/1997 | Andrus et al. ................... | 482/7 |
| 5,839,990 | A * | 11/1998 | Virkkala ........................ | 482/8 |
| 5,888,172 | A * | 3/1999 | Andrus et al. ................... | 482/7 |
| 5,890,995 | A * | 4/1999 | Bobick et al. ................... | 482/4 |
| 6,126,571 | A * | 10/2000 | Parks ............................. | 482/4 |
| 6,152,856 | A * | 11/2000 | Studor et al. .................... | 482/8 |
| 6,244,988 | B1* | 6/2001 | Delman .......................... | 482/8 |
| 6,283,896 | B1* | 9/2001 | Grunfeld et al. .............. | 482/54 |
| 6,458,060 | B1* | 10/2002 | Watterson et al. ............. | 482/54 |
| 6,902,513 | B1* | 6/2005 | McClure ......................... | 482/8 |
| 6,918,860 | B1* | 7/2005 | Nusbaum ...................... | 482/57 |
| 7,060,006 | B1* | 6/2006 | Watterson et al. ............. | 482/54 |
| 2002/0160883 | A1* | 10/2002 | Dugan ............................ | 482/8 |
| 2007/0042868 | A1* | 2/2007 | Fisher et al. .................... | 482/8 |
| 2009/0258758 | A1* | 10/2009 | Hickman et al. ............... | 482/8 |

* cited by examiner

*Primary Examiner*—Loan Thanh
*Assistant Examiner*—Tam Nguyen
(74) *Attorney, Agent, or Firm*—Bacon & Thomas, PLLC

(57) ABSTRACT

A multifunctional virtual-reality fitness equipment provide user to select mode of one user doing exercise alone or multiple users participating in on-line internet competition game with others through internet, which has a detachable interactive manipulator equipped with single-chip microcontroller and served as an interface for coupling conventional fitness equipment and personal computer to enable the conventional fitness equipment to become a novel man-machine interaction fitness equipment having function of internet 3-dimensional virtual simulation, and the communication between the detachable interactive manipulator and the personal computer is achieved by employing male-to-female plug-socket connecting means and according the International Standard Communication Protocol; when the detachable interactive manipulator is connected to a personal computer and a fitness equipment, an automatic detection to software program of personal computer shall be executed, if correct message is detected, the fitness equipment will be set in 3-dimensional virtual simulation mode capable of performing an internet 3-dimensional virtual simulation function, and the user may select this mode to execute an on-line internet competition game with others through internet, however, if no software program of personal computer was detected, the fitness equipment is still used as a conventional fitness equipment to provide user doing exercise alone.

4 Claims, 10 Drawing Sheets

MULTIFUNCTIONAL VIRTUAL-REALITY FITNESS EQUIPMENT WITH A DETACHABLE INTERACTIVE MANIPULATOR

BACKGROUND OF THE PRESENT INVENTION

1. Field of the Present Invention

The invention relates to a multifunctional virtual-reality fitness equipment capably perform an internet 3-dimensional virtual simulation function by using a detachable interactive manipulator as an interface between a fitness equipment and personal computer.

2. Description of Prior Art

Due to industrialization, modern people are actually less and less time and short of space to do outdoor sports including jogging and cycling now. However, for solving the problem of large space needed for doing outdoor sports, many indoor fitness equipments, such as a treadmill, exercise bike and rowing machine etc., have rapidly emerged in response to the trends of doing highly effective exercise needed by modern people.

Take a treadmill as an example, different types of treadmill have been developed, invented and popularly used by the public in recent years. Some treadmills are designed to provide better effect in improving and increasing the exercise of runner's arms and legs, and accompanying with sensing the runner's heart beat during exercise.

And, some treadmills are further designed to provide with the function of simulating road surface condition, by combining virtually simulated scenery along the road with the runner's position and speed being capably controlled and detected on the virtually simulated scenery, the runner have a feeling of in reality personally doing outdoor sports on the scene.

Although modern people have already made use of those conventional indoor fitness equipments to achieve the goal of doing exercise, most conventional indoor fitness equipments are always designed and applied for single user to do exercise only, particularly, can not perform the function of multiple users participating in an internet on-line competition game when multiple users are doing exercise together. Nevertheless, as based on the human nature, the user shall be greatly encouraged if some one else can accompany him/her in doing exercise on a kind of novel fitness equipment with function of being connected to personal computer to execute an on-line internet competition game such as jogging, cycling or rowing.

SUMMARY OF THE PRESENT INVENTION

In view of the above, the major purpose of this present invention is to invent a kind of multifunctional virtual-reality fitness equipment with an invented detachable interactive manipulator for combining conventional fitness equipment with personal computer to perform an internet 3-dimensional virtual simulation.

Another purpose of this present invention is invented a detachable interactive manipulator used on a kind of multifunctional virtual-reality fitness equipment which may automatically detect computer program message of personal computer, if correct message is detected, conventionally operational function on the fitness equipment is stopped, but an internet 3-dimensional virtual simulation is then performed; and user who is doing exercise can select mode of one user doing exercise alone or multiple users participating in on-line competition just to operate on the detachable interactive manipulator according to instruction(s) shown on display of personal compute; however, if no any computer program is detected, the fitness equipment may still be used as a conventional fitness equipment.

Further purpose of this present invention is to disclose an invented detachable interactive manipulator as a separable controller for multifunctional virtual-reality fitness equipment of the invention, which employs single-chip microcontroller and USB transmission protocol to communicate with personal computer and the fitness equipment, when the fitness equipment is not connected to personal computer, the fitness equipment can still be used as a conventional fitness equipment; whereas, when the fitness equipment is connected to personal computer through the invented detachable interactive manipulator, the fitness equipment shall be served as a multifunctional virtual-reality fitness equipment to perform an internet 3-dimensional virtual simulation function including to perform internet on-line competition game service function.

DETAILED DESCRIPTION OF THE PREFERRED EMBODIMENTS

Figure 1:
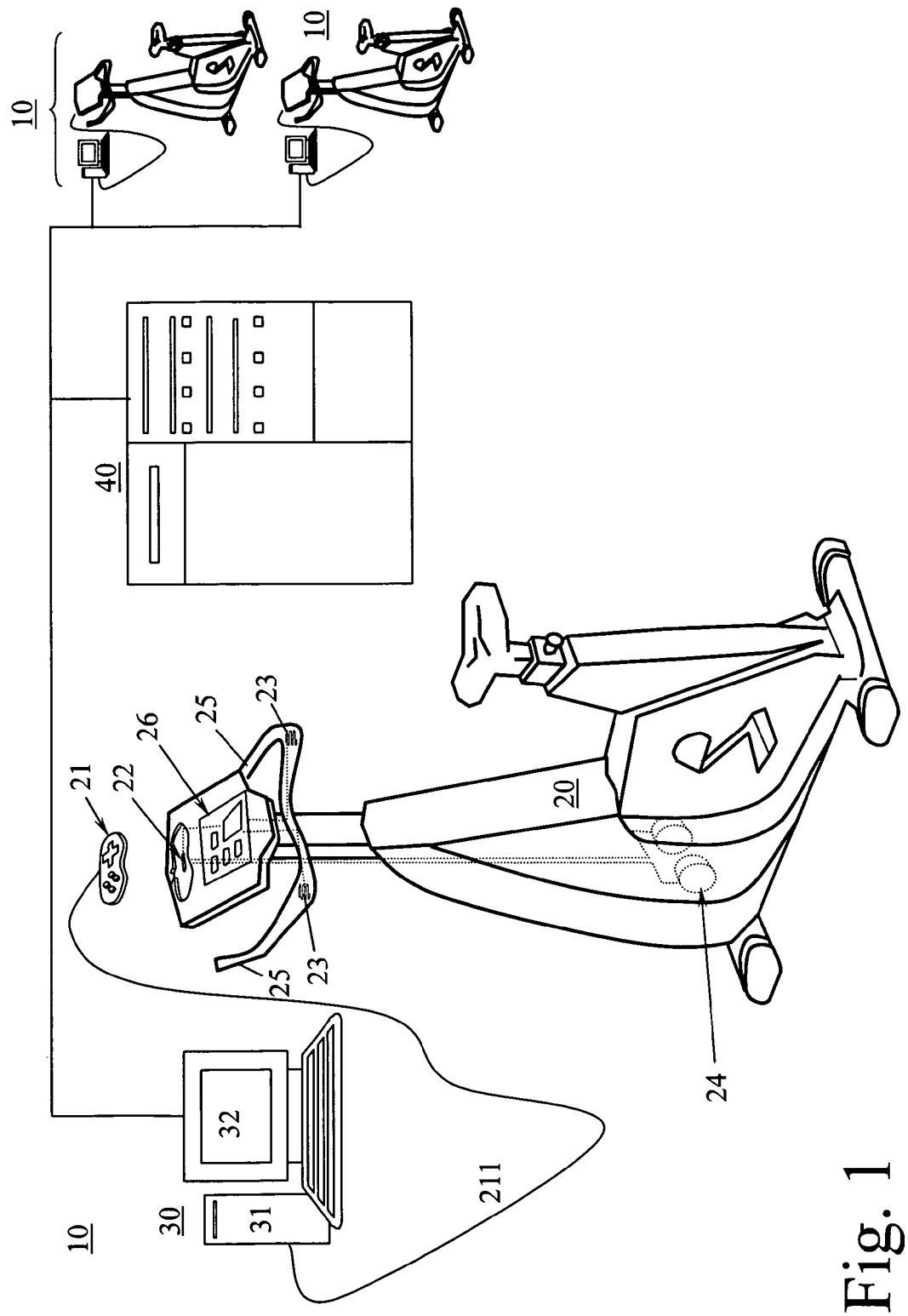
FIG. 1 is a schematic drawing of an embodiment of multifunctional virtual-reality fitness equipment of the invention applied on exercise bike with an internet 3-dimensional virtual simulation function comprising a stationary exercise bike, a personal computer being on-line communication to other fitness equipments through remote internet server, and an invented detachable interactive manipulator equipped with USB interface used to join together the stationary exercise bike and the personal computer.
Figure 2:
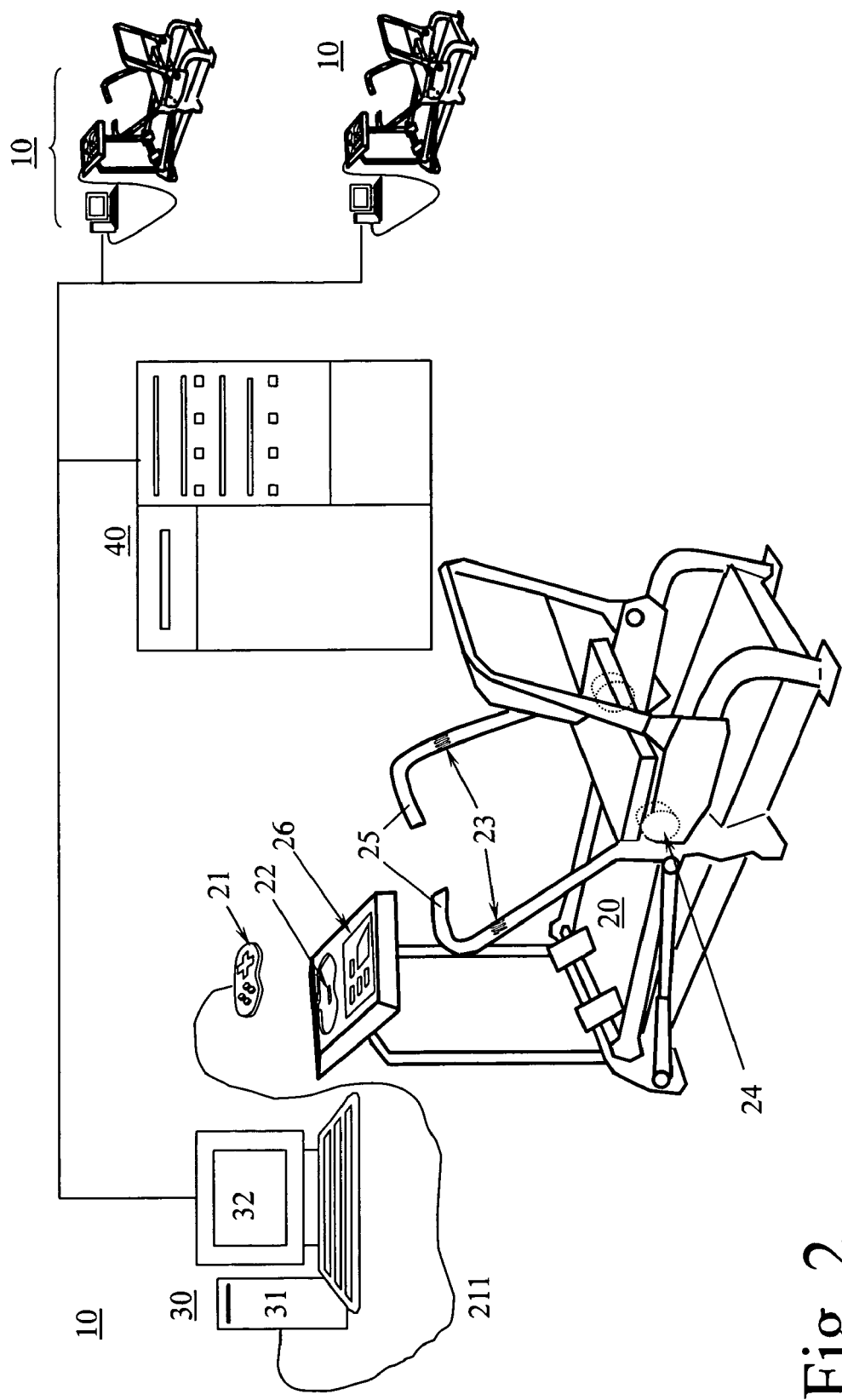
FIG. 2 is a schematic drawing of another embodiment of multifunctional virtual-reality fitness equipment of the invention applied on rowing machine with an internet 3-dimensional virtual simulation function same as that of exercise bike shown on FIG. 1.
Figure 3:
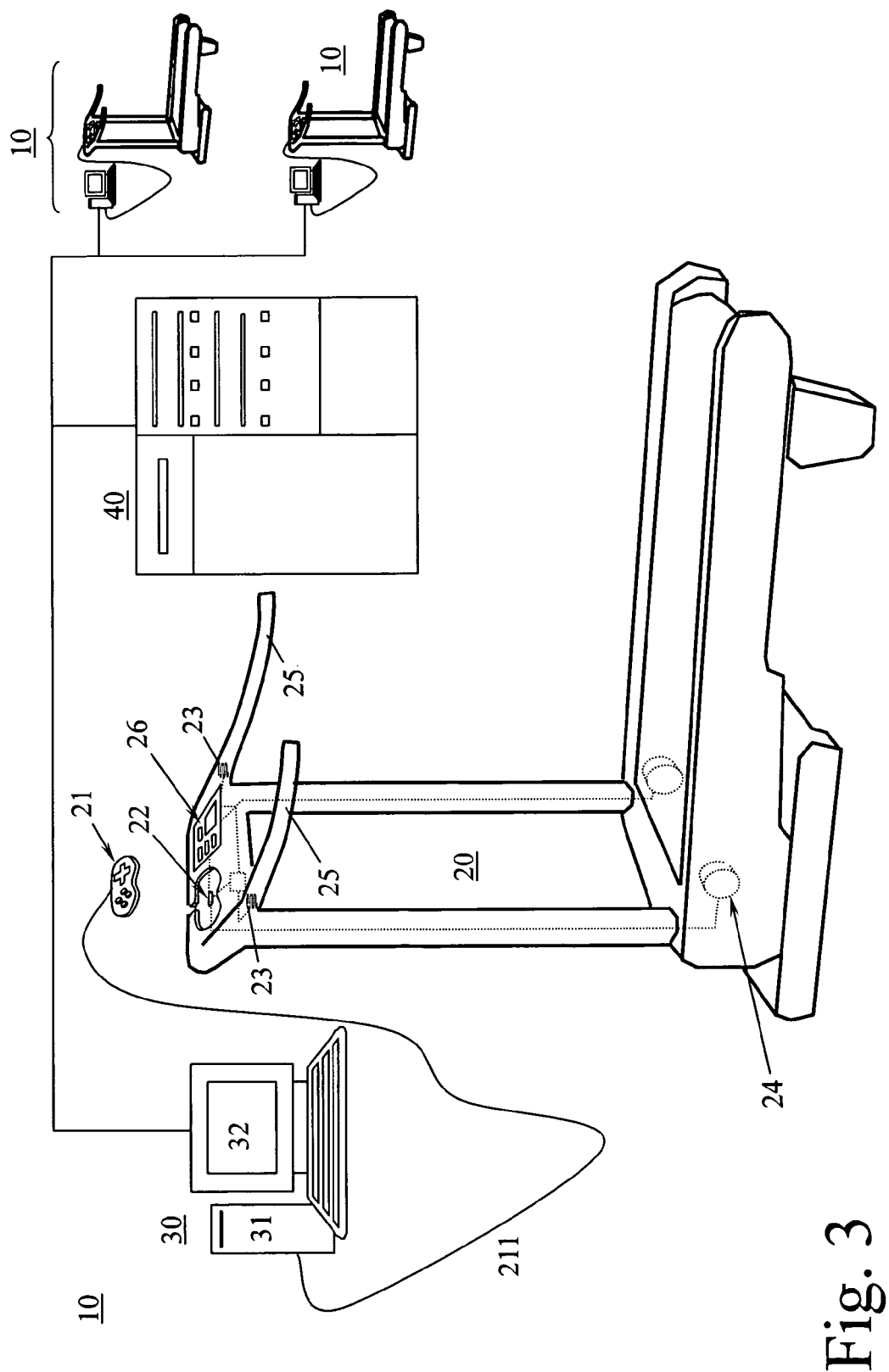
FIG. 3 is a schematic drawing of further another embodiment of multifunctional virtual-reality fitness equipment of the invention applied on treadmill with an internet 3-dimensional virtual simulation function same as that of exercise bike shown on FIG. 1.
Figure 8:
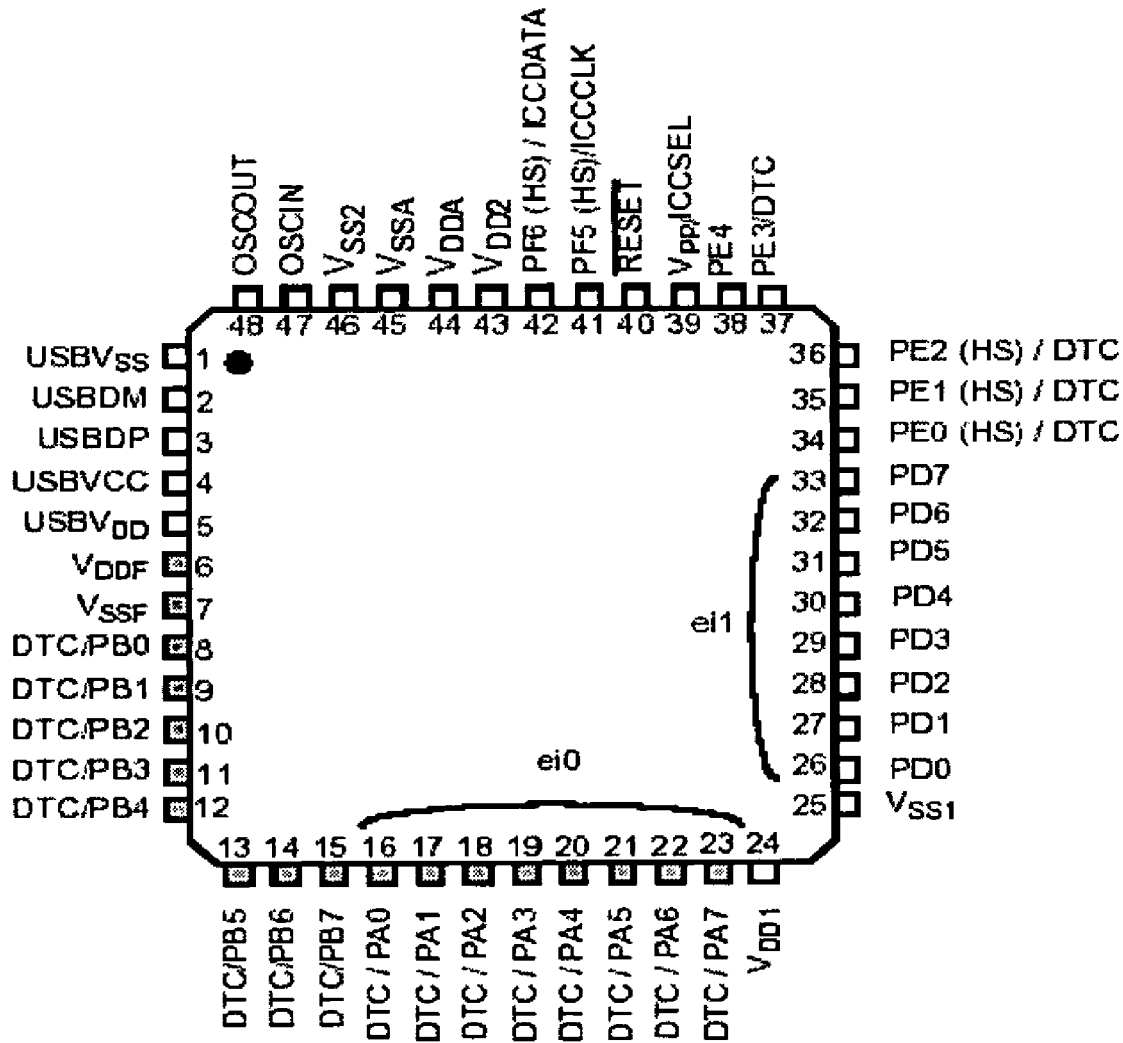
FIG. 8 is a schematic drawing showing the arrangement of connecting pins of the chip ST 72651 used on the detachable interactive manipulator of the invention.

As shown in FIGS. 1 to 3, the key feature of this present invention is invented a detachable interactive manipulator (21) served as a separable controller for the invented multifunctional virtual-reality fitness equipment (10). The detachable interactive manipulator (21) is equipped with ST726x series single-chip microcontroller (214) as shown in FIG. 8, so that the detachable interactive manipulator (21) shall be functionally used as a communication and control interface between a personal computer (30) and corresponding fitness equipment (20).

Figure 6:
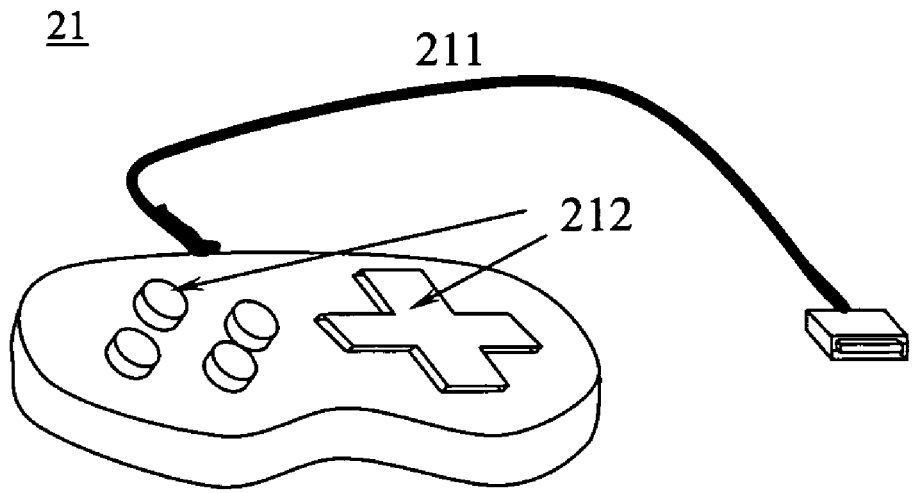
FIG. 6 is front view of the invented detachable interactive manipulator disclosed in the invention.

Therefore, as shown in FIG. 6, by only operating pushbuttons (212) arranged on the detachable interactive manipulator (21), user can easily operate the multifunctional virtual-reality fitness equipment (10) of the invention with an internet 3-dimensional virtual simulation function.

As shown in FIG. 3, to take a treadmill (20) as an illustrated example to the invented multifunctional virtual-reality fitness equipment (10) of the invention, the runner may accord user's interface instructions displayed on the display (32) of personal computer (30) by operating certain pushbutton (212) on the detachable interactive manipulator (21) to select a suitable mode of exercise conditions or requirements to himself or herself.

For example, the runner may select mode of one user doing exercise alone or another mode of multiple users participating in an on-line competition. If mode of one user doing exercise alone is selected, computer processing unit (31) of personal computer (30) will receive a message transmitted from USB transmission line (211) which have been connected to the detachable interactive manipulator (21), and a road scenery image by 3-dimensional virtual simulation is immediately shown on the display (32).

After getting-ready period to start is ended, the runner shall start running exercise according to dynamic image shown on the display (32) and sound effects generated by the personal computer (30). With internet 3-dimensional virtual simulation function, the display (32) may promptly change different road scenery images according to the conditions of running direction and speed of the runner to result in a likely virtual and reality interaction between the runner in doing exercise on the treadmill (20) and the dynamic image shown on the display (32) of personal computer (30).

Since the detachable interactive manipulator (21) of the invention is equipped with ST726x single-chip microcontroller, such as the ST72651 single-chip microcontroller (214) shown in FIG. 8, the detachable interactive manipulator (21) possesses a communication function of USB1.1 with transmission speed of 12 Mbps, and has sixteen sets of digital input, sixteen sets of digital output, eight A/D input ports, and two D/A output ports.

Figure 10:
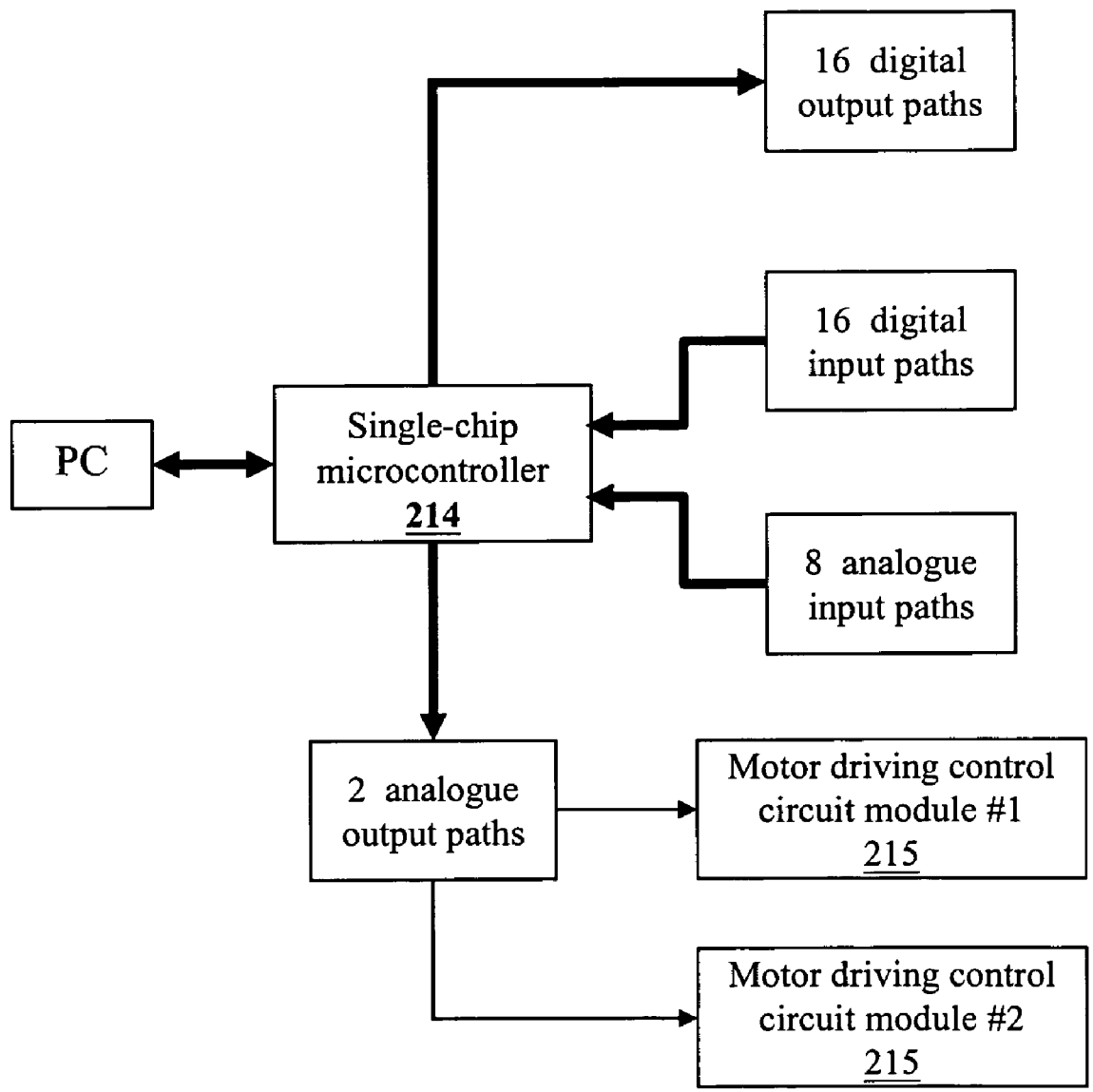
FIG. 10 is a block diagram to show functional or operational principle of a single-chip microcontroller used on the detachable interactive manipulator of the invention.

As shown in FIG. 10, the ST72651 single-chip microcontroller (214) of the detachable interactive manipulator (21) shall be installed on and worked with driving control circuit module (215) designed for the invention, and shall be set on software program designed to convert digital command to analogue signal through D/A output ports, so that the detachable interactive manipulator (21) of the invention enable to make torque control or speed control to motor(s) or electric motor(s) installed on the fitness equipment (20).

Figure 12:
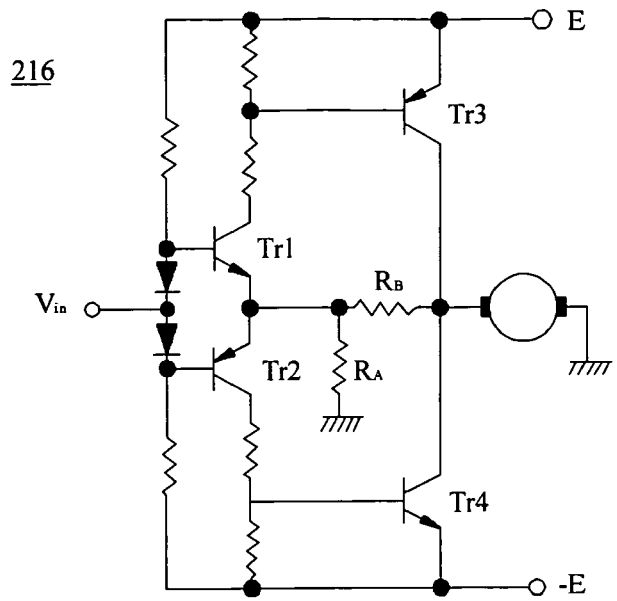
FIG. 12 is a speed control driving circuit used on the invention for motor speed control by means of varying the voltage gain.

To take speed control, the speed of motor(s) or electric motor(s) installed on the fitness equipment (20) can be controlled merely by varying analogue output voltage through a speed control driving circuit (216) with voltage gain control effect as shown in FIG. 12. If the rated current of the motor or electric motor installed on the fitness equipment (20) is too high, the connection of Tr' and Tr4 of the speed control driving circuit (216) can be changed to Darlington connection.

Figure 13:
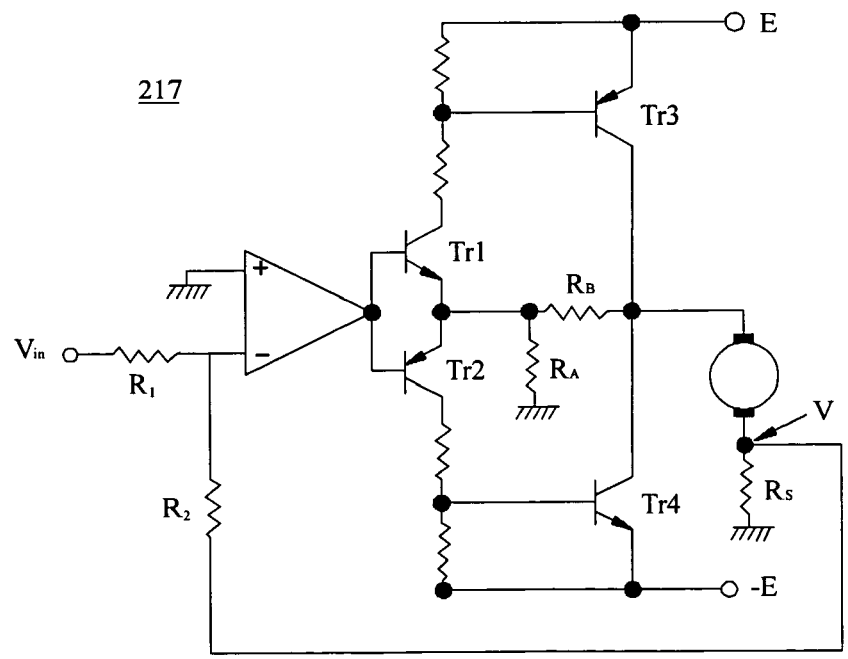
FIG. 13 is a torque control driving circuit to take torque control for an electric motor used on the invention.

To take torque control, a torque control driving circuit (217) as shown in FIG. 13 is used on this present invention, which is a clockwise/counterclockwise rotation driving current control circuit with function of analogue voltage capably varied through the torque control driving circuit (217). A low resistance resistor $R_3$ is connected with motor in series connection for testing and measuring the current. Then, by employing the theory of manipulation amplifier, we have $V_3/R_2 = -Vin/R_1$.

Due to electric current flowing through motor same as that current flowing through Rs, i.e. Ia=Vs/Rs, then Ia=$-[R_2/(R_1 \times Rs)] \times $Vin.

From the formula it shows that a control of the motor current Ia shall be achieved simply by controlling the voltage Vin, and this will in turn control the output torque of motor.

Further, due to nine sets of digital input of the ST72651 single-chip microcontroller (214) being used to arrange on input pushbuttons (212) of the detachable interactive manipulator (21), the user may operate those input pushbuttons (212) of the detachable interactive manipulator (21) to select a suitable mode of exercise conditions or requirements to himself or herself by following some user's interface instructions shown on the display (32) of personal computer (30).

As shown in FIGS. 1, 2, 3 and 10, signals from input pushbutton (212) of the detachable interactive manipulator (21), after decoding by driving control circuit module (215), are transmitted to the computer processing unit (31) of personal computer (30) through USB transmission wire (211) connected between the personal computer (30) and the detachable interactive manipulator (21). Then the computer processing unit (31) will execute some necessary processes and send instruction message to the user through the display (32) of personal computer (30) right after receiving the operating message transmitted from the detachable interactive manipulator (21) to let user know what current state of system is proceeding now and what operation instruction to next step is going to do. Meanwhile, the necessary message or commend is transmitted to the control software (hereinafter referred to as "firmware") of ST72651 single-chip microcontroller (214) of the detachable interactive manipulator (21) through USB transmission wire (211). Then the firmware of ST72651 single-chip microcontroller (214) will send necessary output to the hardware according to the message or commend of personal computer (30). The hardware defined in this invention shall include motor(s) controlled by analogue signal, switches or indicating lamps controlled by different digital signal outputs.

When the A/D digital input port of ST72651 single-chip microcontroller (214) of the detachable interactive manipulator (21) is connected to output port of a analogue sensor component of the fitness equipment (20) of the invention, the value, normally the electric potential value, sensed by the analogue sensor component is then converted into digital signal perceivable by computer and transmitted to personal computer (30) through USB transmission wire (211).

Then, after the computer processing unit (31) of personal computer (30) has received those digital signals, the software program set on the computer processing unit (31) of personal computer (30) will immediately identify the meaning of digital values to execute some necessary procedures. In one aspect, the display (32) of personal computer (30) shall simultaneously display the current state of the runner already done including geographical location, speed, direction, pulse, calorie consumption and place etc., in the other aspect, some necessary messages or commends shall through USB transmission wire (211) be output and transmitted to firmware of ST72651 single-chip microcontroller (214) of the detachable interactive manipulator (21). Resulted in the necessary outputs from firmware of the detachable interactive manipulator (21), for corresponding to the messages or commands transmitted from the computer processing unit (31), shall be made to control the fitness equipment (20) of multifunctional virtual-reality fitness equipment (10) of the invention.

As shown in FIGS. 1 to 5, the analogue sensor component installed on the fitness equipment (20) of the invented multifunctional virtual-reality fitness equipment (10) includes torque sensor (23) and location sensor (24), wherein the torque sensor (23) may be a set of differential strain sensor which comprises two strain gages mounted on both sides of the handlebar (25) of the fitness equipment (20); in addition, the torque sensor (23) may also be a torque meter. And, the location sensor (24) may be a potentiometer or a location encoder.

Figure 4:
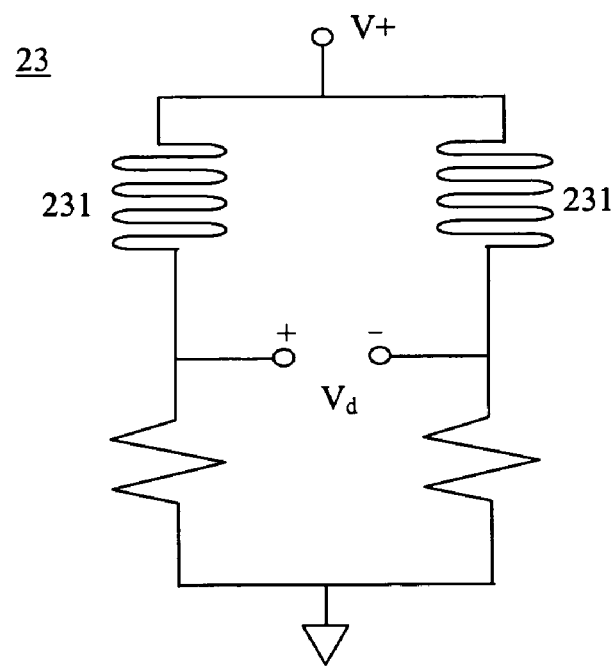
FIG. 4 is a structural drawing for a differential strain sensor used on a fitness equipment of the invention.

Here are two embodiments of the torque sensor (23) employed by the invention; one of them has structure with strain material (231) shown in FIG. 4. The left and right hand of the user shall exert different torque force on left and right handlebar (25) of the fitness equipment (20) separately that generate different distortion on those strain materials (231) in turn and cause change in resistance value of those strain materials (231) which can be express as follows:

$$\Delta R = R\left(1 + k\frac{(L+\Delta L)^2}{L^2}\right)$$

Where R is the resistance value of the strain material (231) which is not exerted the tensile force; L is the original length of the strain material (231); ΔR and ΔL are the increment of the resistance and length of the strain material (231) respectively after an elongation is produced under tensile force; k is the correction factor of stress-strain sensor.

From the above-mentioned formula, it shows that the variation of a resistance depends on the variation of length of the strain material (231), and the variation of length depends on the magnitude of the tensile force exerted on the strain material (231) in axial direction, also the magnitude of tensile force in axial direction depends on the torque force exerted on the handlebar (25) of the fitness equipment (20) by the hand of the user. Therefore, the magnitude of torque exerted by left and right hand of the user will determine the resistance value of the torque sensor (23), this will in turn cause difference in electric potential in left and right side which after conversion calculation according to some specific proportion can represent the magnitude and direction of the angle to turn into by the user during exercise according to the scene image.

The electric potential difference detected by the torque sensor (23) is then converted into computer perceivable digital signal by the A/D port of the detachable interactive manipulator (21) of the invention, and the digital signal is transmitted through USB transmission wire (211) to the software program the computer processing unit (31) of personal computer (30) is executing. Then the software program will immediately identify the turning direction either in left or in right and the turning angle represented by the digital signal, and readjust the scene image according to the required view angle, and finally, the scene image is shown on the display (30) of personal computer (30).

Figure 5:
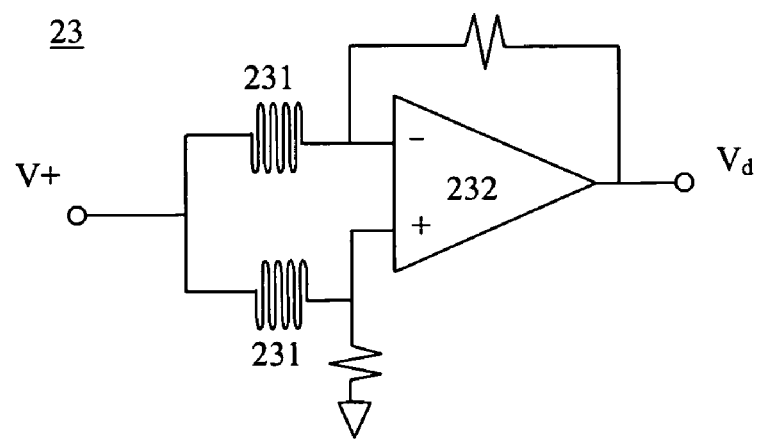
FIG. 5 is another structural drawing for a differential strain sensor used on a fitness equipment of the invention.

The second type of torque sensor (23) has a structure as shown in FIG. 5 and working principle similar to that of first type of torque sensor (23) mentioned above, different torque force are exerted by the left hand and right hand of the user on the handlebar (25) of the fitness equipment (20) that cause the left and right side strain material (231) to generate different deformation corresponding to the torque exerted by left and right handlebar (25) of the fitness equipment (20). The difference in deformation between left and right strain material (231) of torque sensor (23) will generate an electric potential difference between left side and right side, then the electric potential difference, i.e. the voltage signal, after amplified by amplifier (232) and converted according to some specific proportion, will represent the required direction and angle the user needs to turn. The principle of transmission and conversion of the voltage analogue signal is similar to that of first type of torque sensor (23) mentioned above.

As illustrated in FIG. 1, this multifunctional virtual-reality fitness equipment (10) of the invention is applied on an internet virtual simulation exercise bike (20). The rider on the exercise bike (20) shall determine the direction of the exercise bike (20) in the 3-dimensional virtual simulation scene image simply by exerting different force on left and right handlebar (25), and the amount of displacement of the exercise bike (20) in the 3-dimensional virtual simulation scene image can be determined by the electric potentiometer or location encoder (24) mounted on the pedal of the exercise bike (20).

Take potentiometer as an example, when the pedal of the exercise bike (20) is in different angular position in a cycle the potentiometer will generate different output of different electrical potential difference which can be used for calculating the distance ridden by the rider by way of counting the number of cycles of the pedal traveled.

FIG. 2 is another application of this multifunctional virtual-reality fitness equipment (10) of the invention applied on internet virtual simulation sports rowing machine (20). The relative displacement and direction of the rowing machine (20) in 3-dimensional virtual simulation scene image shall be determined in such a way that the analogue signal output of the potentiometer (24) mounted on the oar shaft of the rowing machine (20) is converted into computer perceivable digital signal through the A/D port of the detachable interactive manipulator (21) of the invention, then the digital signal is transmitted through USB transmission wire (211) to the software program of 3-dimensional virtual simulation for rowing which is being executed by the computer processing unit (31) of personal computer (30). The software program set on the computer processing unit (31) will immediately identify these two types of signal, and determine the location and direction of the rowing boat after calculation.

FIG. 3 is further another application of this multifunctional virtual-reality fitness equipment (10) of the invention applied on internet virtual simulation treadmill (20), the direction of runner to run is determined by comparing the force exerted on left and right handlebar (25) of the treadmill (20) by the runner.

From those embodiments as illustrated above, we see that most conventional fitness equipments can be effectively upgraded by combining the fitness equipment with personal computer (31) through the invented detachable interactive manipulator (21) of the invention to form the multifunctional virtual-reality fitness equipment (10) with function of combining internet competition game and 3-dimensional virtual simulation of sports scene image.

Figure 7:
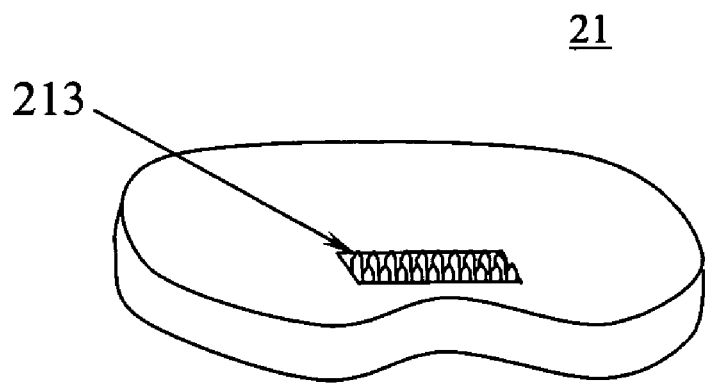
FIG. 7 shows the configuration of the detachable interactive manipulator of the invention viewed from the reverse side.

The invented detachable interactive manipulator (21) of the invention is shown as in FIGS. 6 and 7 which key features is equipped with a ST726x series single-chip microcontroller (214) connected to relative driving control circuit module (215).

Figure 9:
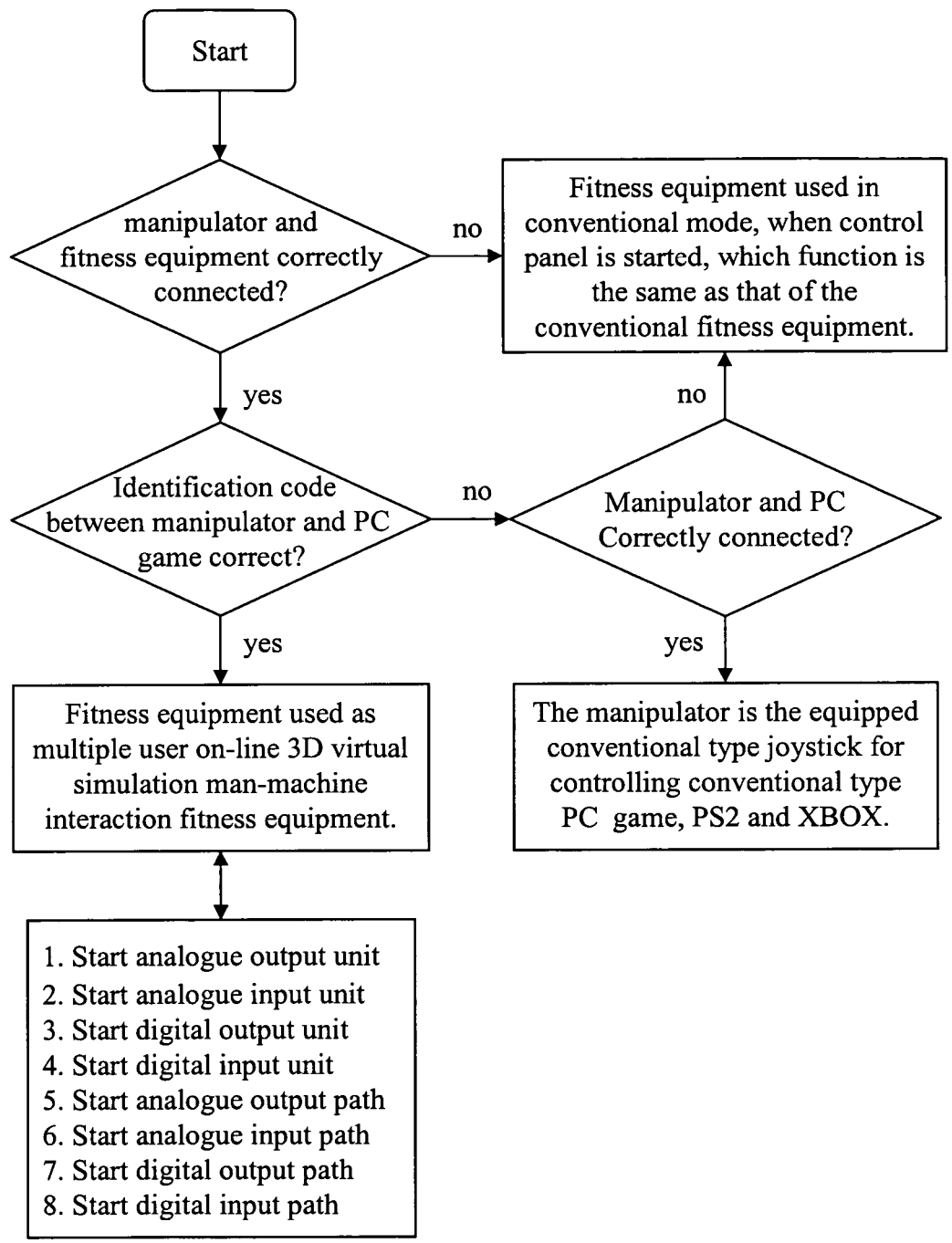
FIG. 9 is a block diagram applied on multifunctional virtual-reality fitness equipment of the invention for showing the working principle of application among the invented detachable interactive manipulator, the fitness equipment and the personal computer.

Particularly, the invented detachable interactive manipulator (21) is provided with those working functions depicted as the flow diagram in FIG. 9, when a user is going to use the multifunctional virtual-reality fitness equipment (10) of the invention, the invented detachable interactive manipulator (21) may be selectively joined to or detached from corresponding fitness equipment (20) of the invention by the user.

As shown in FIGS. 1 to 3, if the user selects to join the invented detachable interactive manipulator (21) of the invention to the corresponding fitness equipment (20) together, this multifunctional virtual-reality fitness equipment (10) of the invention shall provide function of internet competition game and 3-dimensional virtual simulation of sports scene image to the use.

The invented detachable interactive manipulator (21) has a signal transmission interface such as an USB interface used to connect a signal transmission wire (211), so that the invented detachable interactive manipulator (21) shall be connected to personal computer (30) through signal transmission wire (211), and the user shall input and transmit information to the personal computer (30) through operating the input pushbutton (212) arranged on the face-plate of the invented detachable interactive manipulator (21).

The invented detachable interactive manipulator (21) has 20-pins plug-socket connector (213) arranged on the reverse side as shown in FIG. 7. As shown in FIGS. 1 to 3, for constituting a male-to-female connection, each fitness equipment (20) of the invention has a corresponding plug-socket connector (22) arranged on the face-plate (26) of the fitness equipment (20) and designed to enable in connection with 20-pins plug-socket connector (213) of the detachable interactive manipulator (21).

Depending on use's selection, when the 20-pins plug-socket connector (213) of the detachable interactive manipulator (21) and the corresponding plug-socket connector (22) on the fitness equipment (20) are selectively coupled together, each pins of this detachable interactive manipulator (21) of the invention shall be in the following definition:

Pin 0 24 volts power supply;
Pin 1 Analogue signal input 1, used for connecting analogue sensor component output on the fitness equipment (20);
Pin 2 Analogue signal input 2, used for connecting analogue sensor component output on the fitness equipment (20);
Pin 3 Analogue signal input 3, used for connecting analogue sensor component output on the fitness equipment (20);
Pin 4 Analogue signal output 1; used for making torque control or speed control to motor(s) or electric motor(s) on the fitness equipment (20);
Pin 5 Analogue signal output 2; used for making torque control or speed control to motor(s) or electric motor(s) on the fitness equipment (20);
Pin 6 Analogue signal common grounding;
Pin 7 Digital signal output 1, Mode change pin; to take treadmill as an example, when high output, the mode is 3-dimensional virtual simulation treadmill; when low output, the mode is conventional treadmill;
Pin 8 Digital signal output 2, used for controlling digital sensing com input on the fitness equipment (20);
Pin 9 Digital signal output 3, used for controlling digital sensing com input on the fitness equipment (20);
Pin 10 Digital signal output 4, used for controlling digital sensing com input on the fitness equipment (20);
Pin 11 Digital signal output 5, used for controlling digital sensing com input on the fitness equipment (20);
Pin 12 Digital signal input 1, used for connecting digital sensor component output on the fitness equipment (20);
Pin 13 Digital signal input 2, used for connecting digital sensor component output on the fitness equipment (20);
Pin 14 Digital signal input 3, used for connecting digital sensor component output on the fitness equipment (20);
Pin 15 Digital signal input 4, used for connecting digital sensor component output on the fitness equipment (20);
Pin 16 Digital signal input 5, used for connecting digital sensor component output on the fitness equipment (20);
Pin 17 Digital signal input 6, used for connecting digital sensor component output on the fitness equipment (20);
Pin 18 Digital signal input 7, used for connecting digital sensor component output on the fitness equipment (20);
Pin 19 Digital signal common grounding.

Therefore, when a user selects the invented detachable interactive manipulator (21) connected to corresponding fitness equipment (20), the ST726x series single-chip microcontroller (214) of the invented detachable interactive manipulator (21) will possess the function as depicted in FIG. 10 to enable the fitness equipment (20) in interaction with the personal computer (30), the user shall enter on internet competition game with 3-dimensional virtual simulation of sports scene image.

As shown in FIG. 9 and in conjunction with the abovementioned embodiments, when the detachable interactive manipulator (21) of the invention is connected to personal computer (30), it can communicate with the software being executed by the computer processing unit (31) of personal computer (30) to conform whether the identification code is correct or not. If it is correct, the software set in processing unit (31) of personal computer (30) and the firmware of the detachable interactive manipulator (21) can operate in normal condition, otherwise, the software set in the computer processing unit (31) will have the program retreated, and indicate that the identification code of the detachable interactive manipulator (21) is wrong that results in the failure of achieving interaction between the fitness equipment (20) and the 3-dimensional virtual simulation software.

In case the connection between the detachable interactive manipulator (21) and the personal computer (30) is not successfully established, or, the 3-dimensional virtual simulation software is not started, the detachable interactive manipulator (21) will automatically switch the operating mode to the general operating mode after the detachable interactive manipulator (21) is connected to the fitness equipment (20); while in this case the fitness equipment (20) shall operate in the conventional function, the user may directly operate the equipment with the function shown on control panel (26) of the fitness equipment (20).

If the identification code of the detachable interactive manipulator (21) is examined to be correct, the 3-dimensional virtual simulation software of personal computer (30) shall completely communicate with the fitness equipment (20) through the firmware of the detachable interactive manipulator (21).

When the detachable interactive manipulator (21) and the 3-dimensional virtual simulation software of personal computer (30) are joined together, the detachable interactive manipulator (21) will automatically switch to 3-dimensional virtual simulation mode, and then the fitness equipment (20) will possess the functions including conventional operation, and internet competition game with 3-dimensional virtual simulation of sports scene image.

Figure 11:
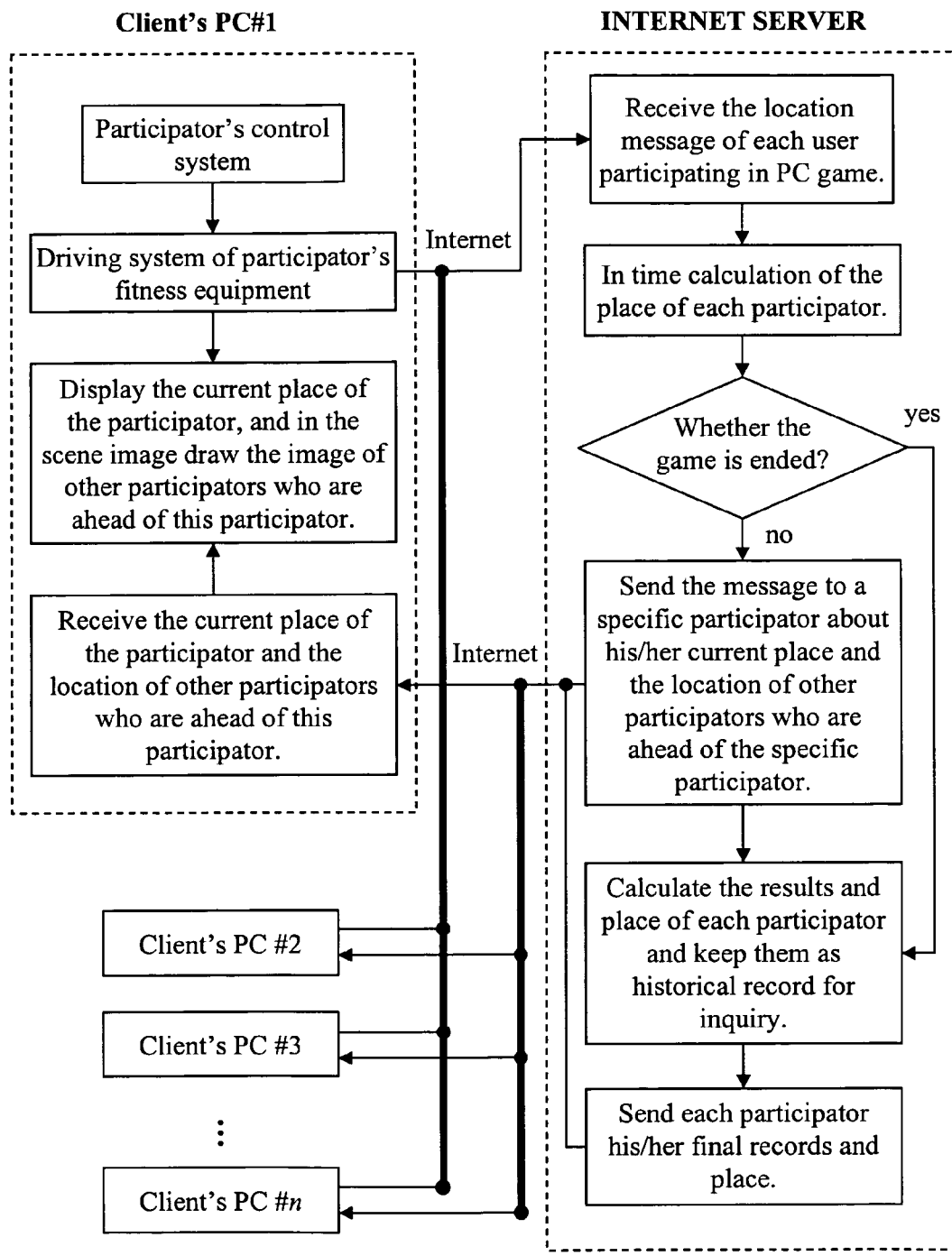
FIG. 11 is a communication and working block diagram to show operational principle of the invention applied between multiple clients' PC on-line and server.

The flow diagram shown in FIG. 11 illustrates the communication and processing work between personal computers (30) of the clients and an internet server (40) during executing the multiple user on-line internet competition game function.

As illustrated in FIGS. 1 to 3, this multifunctional virtual-reality fitness equipment (10) of this present invention may be applied on different kinds of conventional fitness equipment, and particularly possess the function of 3-dimensional virtual simulation image for single user doing exercise by himself/herself or for multiple users voluntarily participating in on-line contest with others through internet.

In case of executing internet on-line competition game, the manner to carry out the internet game is shown in FIG. 11. User can operate the input pushbutton (212) on the detachable interactive manipulator (21) to select the desired mode such as one user doing exercise or multiple users carrying on-line sports competition game.

However, if multiple users are carrying out on-line sports competition game, the required message, such as the total number of persons participating the game at present and the time to start count-down etc., shall be updated and sent in time to the personal computer (30) of every participator, then the message shall be displayed on the display (32) of personal computer (30) for the participator to prepare for the game according to the time message shown on the display (32).

After the game starts, the detachable interactive manipulator (21) of each participator will in time receive the analogue or digital signal from torque sensor (23) and location sensor (24). The signal, after being converted into digital type, shall be transmitted to computer processing unit (31) of personal computer (30) through USB transmission wire (211), and read by the 3-dimensional virtual simulation software being executed by the personal computer (30) to determine the relative location, speed and direction of the participator presently in the 3-dimensional virtual simulation scene image, and the message of the relative location of the user shall be sent to internet server (40) for calculating the place of each participator based on the relative location message, and then the message including the place of each participator and the relative location of 5~10 participators who are ahead of a specific participator shall be transmitted back to the computer (30) of the specific participator, and the display (32) of the participator's computer (30) will display the place of himself/herself, and in time display the dynamic virtual image of 5~10 participators who are ahead of himself/herself at the relative location of the 3-dimensional virtual simulation scene image.

Besides the display (32) of personal computer (30) will also display the personal information of the user including current location, speed, direction, pulse, calorie consumption etc., and the record achieved by the user in a competition game will be kept in server (40) as historical record.

In case the user selects one person doing exercise alone, the display (32) of personal computer (30) will perform the same as that in the multiple user participation mode except the information of other participators and the place of the participator in doing exercise.

What is claimed is:

1. A multifunctional virtual-reality fitness assembly for displaying a three-dimensional virtual simulation image to a single user doing exercise by himself/herself and/or for multiple users participating in an on-line competition with others through a remote Internet server, the assembly comprising a corresponding fitness apparatus and a detachable interactive manipulator connected by a signal transmission wire to a personal computer for on-line communication to at least one other fitness apparatus through a remote internet server, wherein the detachable interactive manipulator transmits signals from the corresponding fitness apparatus to the personal computer and transmits three-dimensional virtual simulation scene images from the personal computer to a display for display to the user, wherein the detachable interactive manipulator is an input/output device adapted to be removably connected to the corresponding fitness apparatus, the detachable interactive manipulator including a user interface that, when the detachable interactive manipulator is joined to the corresponding fitness apparatus, the detachable interactive manipulator enables the user to select either to exercise alone or to exercise with multiple users participating in an on-line competition, the detachable interactive manipulator comprising a 20-pin plug-socket connector arranged on a reverse side from the user interface, the 20-pin plug-socket connector possessing a plurality of analog signal input pins and analog signal output pins; and a single-chip microcontroller that converts digital information transmitted from the signal transmission wire into analog information, transmitting an analog signal to the analog signal output pin of the 20-pins plug-socket connector, converting the analog signal from the analog signal input pins of the 20-pin plug-socket connector into digital information, and transmitting said digital information to the personal computer; and wherein the corresponding fitness apparatus comprises:

a corresponding plug-socket connector arranged on a faceplate of the corresponding fitness apparatus for completing a male-to-female connection to the 20-pin plug-socket connector of the detachable interactive manipulator, the corresponding plug-socket connector having a plurality of analog signal input pins corresponding to analog signal output pins of the 20-pin plug-socket connector of the detachable interactive manipulator; and having multiple analogue signal output pins corresponding to analog signal input pins of the 20-pin plug-socket connector of the detachable interactive manipulator; and one or more torque sensor and/or and location sensors connected to at least one of the analog signal output pin-pins of the corresponding plug-socket connector.

2. The multifunctional virtual-reality fitness assembly as defined in claim 1, wherein the torque sensor is a set of differential strain sensors comprising two strain gauges mounted on both sides of a handlebar of the corresponding fitness apparatus.

3. The multifunctional virtual-reality fitness apparatus as defined in claim 1, wherein the series single-chip microcontroller identifies and determines whether a connection between the detachable interactive manipulator and the corresponding fitness apparatus has been established.

4. The multifunctional virtual-reality fitness assembly as defined in claim 1, wherein the single-chip microcontroller further provides an identification code used for the detachable interactive manipulator and the personal computer to identify each other before transmitting three-dimensional virtual simulation software from the personal computer to the display through the detachable interactive manipulator.

* * * * *